Sept. 14, 1937.   J. R. CRAIG   2,093,311
LIQUID TREATING DEVICE
Filed Nov. 6, 1935
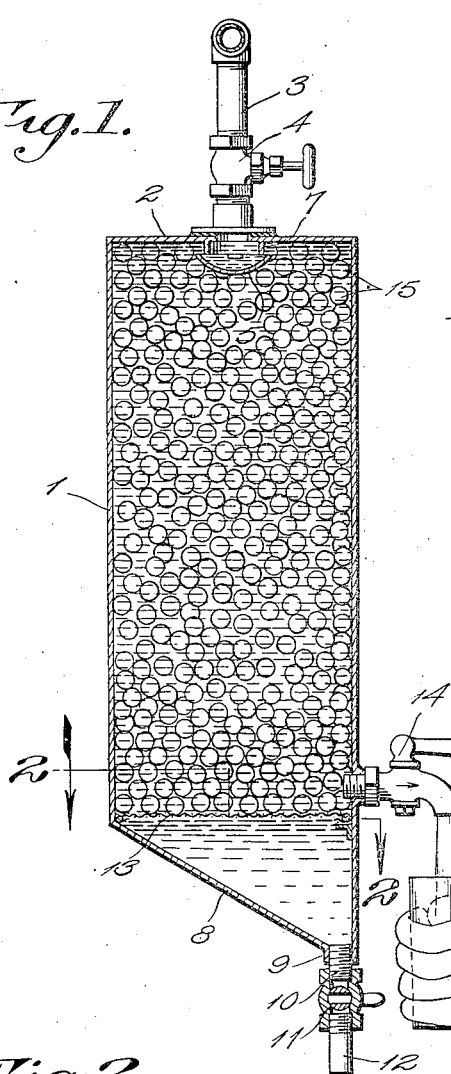
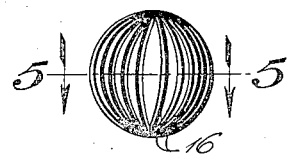
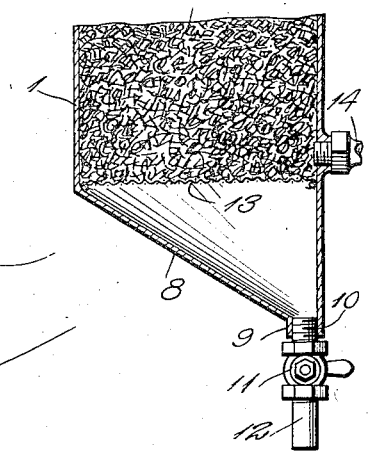
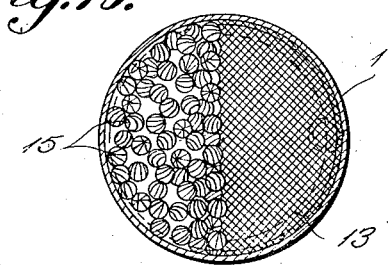
John R. Craig
INVENTOR
BY Victor J. Evans & Co.
ATTORNEY
WITNESS

Patented Sept. 14, 1937

2,093,311

UNITED STATES PATENT OFFICE 2,093,311

LIQUID TREATING DEVICE

John R. Craig, Pittsburgh, Pa.

Application November 6, 1935, Serial No. 48,555

2 Claims. (Cl. 210—131)

This invention relates to liquid treating devices, and its general object is to provide a device of that character in which glass in any form, such as glass balls, objects, particles, pieces, ground, wool and the like, is utilized as a filtering and treating medium, in that it separates and removes foreign matter from liquids percolated therethrough and renders the same free from dirt, impurities, chemicals and minerals in suspension and solution, with the result, when liquid such as water is passed through the glass, the water is rendered pure and soft for use for various purposes, where water of that character is necessary or desirable.

A further object of the invention is to provide a liquid treating device which can be readily drained and kept in a clean and sanitary condition, is simple in construction, inexpensive to manufacture and extremely efficient in use and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a sectional view taken through my liquid treating device, showing the use of glass balls as a treating medium for the liquid.

Figure 2 is a sectional view taken approximately on line 2—2 of Figure 1, looking in the direction of the arrows.

Figure 3 is a fragmentary sectional view showing the use of cracked and ground glass as a treating medium.

Figure 4 is a view of one of the glass balls.

Figure 5 is a sectional view taken approximately on line 5—5 of Figure 4, looking in the direction of the arrows.

Referring to the drawing in detail, it will be noted that I have illustrated my device as being in the form of a container 1 of substantially cylindrical formation, but I want it understood that any type of housing means for the glass whereby water may be passed therethrough, may be utilized for the purpose intended.

The container 1 is shown as having a closed top 2, but the top may be open and closed by a suitable cover detachably secured to the body of the container by any suitable means. In any event, the top 2 has an opening therein to receive an inlet pipe 3 which is in communication with a suitable source of liquid supply and a valve 4 for controlling the passage of liquid to the container is arranged in the inlet pipe. Arranged below the inlet end of the pipe 3 is a baffle plate 5 which is preferably of curved formation with its concaved portion disposed uppermost and the plate 5 is secured to and suspended from the top 2 by bracket means 7 in a manner to be spaced from and surround the inlet end, as clearly shown in Figure 1. It will be obvious, that the curved baffle plate will spread the incoming liquid radially in spray formation, for disposal through the treating medium, with minimum agitation to assure complete and proper treatment thereof.

The lower end of the container 1 is provided with a sloping wall portion 8 of curved formation and which is directed toward the outlet end of the container, the outlet end terminating in a collar portion 9 to receive a nipple 10 and secured to the nipple is a valve 11, the latter having a drain pipe 12 secured to and depending therefrom.

Disposed at the juncture of the sloping wall portion 8 with the body of the container 1 is a screen 13 having interstices of a size to allow for the passage of foreign matter, but prevents the glass objects, pieces, particles, etc., from passing therethrough, so that foreign matter will accumulate in the sloping wall portion and be drained therefrom, as will be apparent. Above the screen and adjacent thereto is a discharge opening within which may be secured a pipe, but I have shown a faucet 14 threaded into the opening whereby the treated water can be removed directly from the container.

In Figure 1, I have shown the use of glass balls 15 as a treating medium for the water and while these balls may be smooth, it is preferred that they have grooves 16 arranged therein. The grooved balls have a tendency to create more friction when the water passes over the same and give better results than when the balls are smooth.

In Figure 3 I have illustrated the use of particles 17 of glass, and while I have shown glass balls and particles of glass as a treating medium, I want it understood that any type of small glass objects, pieces of glass broken or otherwise, ground glass, or wool glass may be employed as the treating medium for the liquid.

The glass balls or cracked or ground glass not only filters the liquid, but has a tendency to treat the same in a manner to remove foreign matter therefrom and when water is passed or percolated through the glass in any form, it is not only rendered free from impurities, but is likewise soft, consequently the glass purifies and softens the water.

Any liquid may be rendered free from foreign matter by my glass treating device including oil, and water so treated can be used for any purpose where the use of pure and soft water is necessary or desirable.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. In a liquid treating device, a plurality of glass balls having grooves therein, and means for holding the balls in mass formation for the passage of the liquid therethrough.

2. A liquid treating device comprising a container including a body, inlet means at the top of the container, a curved baffle plate underlying and spaced from the inlet means in the path of liquid therefrom to spread the liquid radially in spray formation, a restricted lower portion for the container, screening means dividing the restricted lower portion from the body, a plurality of glass balls having grooves therein and substantially filling said body for the liquid to percolate therethrough, and outlet means for the body and the restricted lower portion respectively.

JOHN R. CRAIG.